Oct. 4, 1938.  J. E. GRIFFITH  2,132,026
FORWARD VIEW MIRROR FOR AUTOMOBILES
Filed July 27, 1936  2 Sheets-Sheet 1
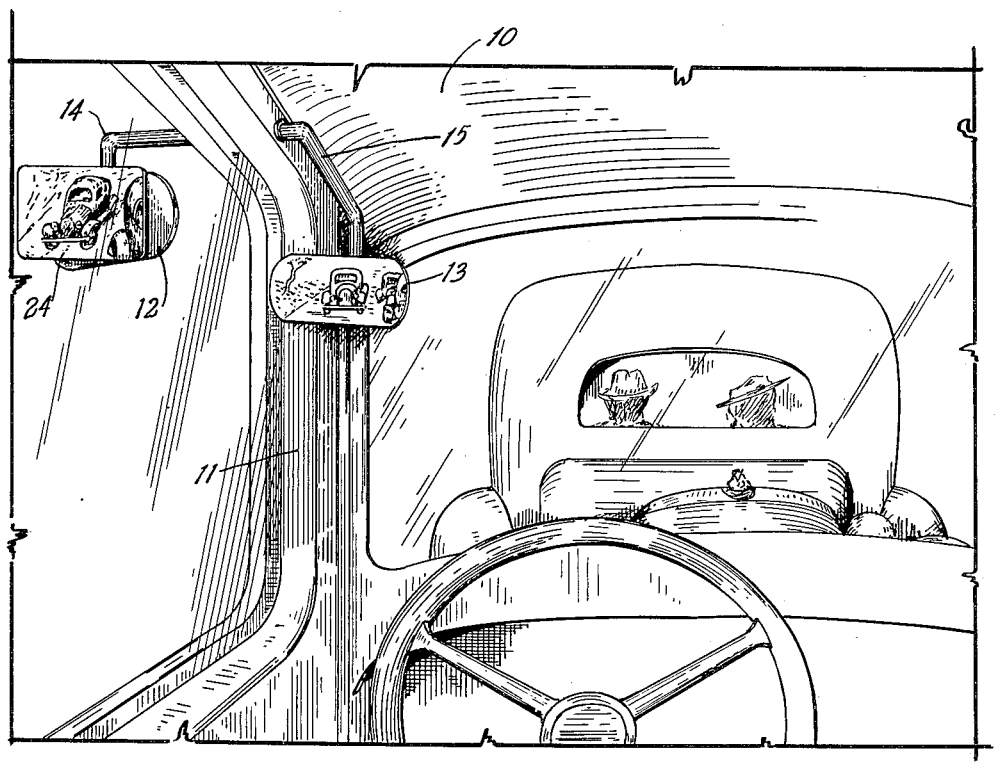
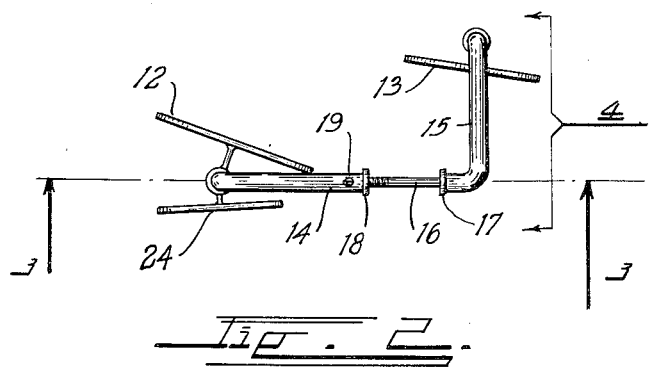
INVENTOR.
JAMES E. GRIFFITH
BY
ATTORNEY.

Oct. 4, 1938.  J. E. GRIFFITH  2,132,026
FORWARD VIEW MIRROR FOR AUTOMOBILES
Filed July 27, 1936   2 Sheets-Sheet 2
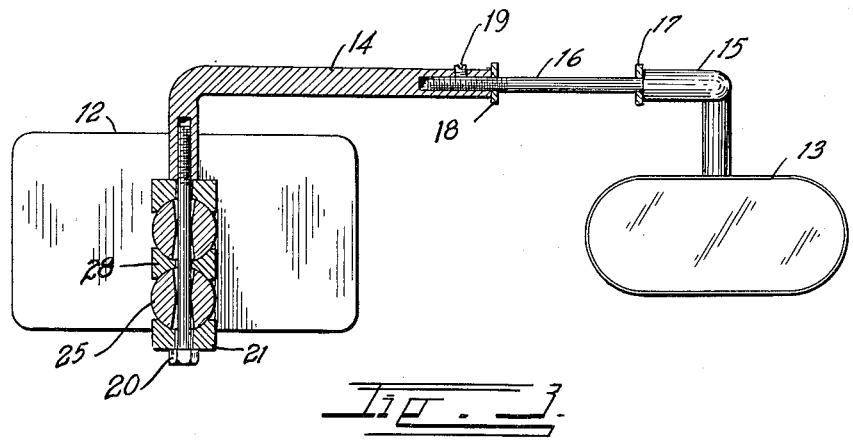
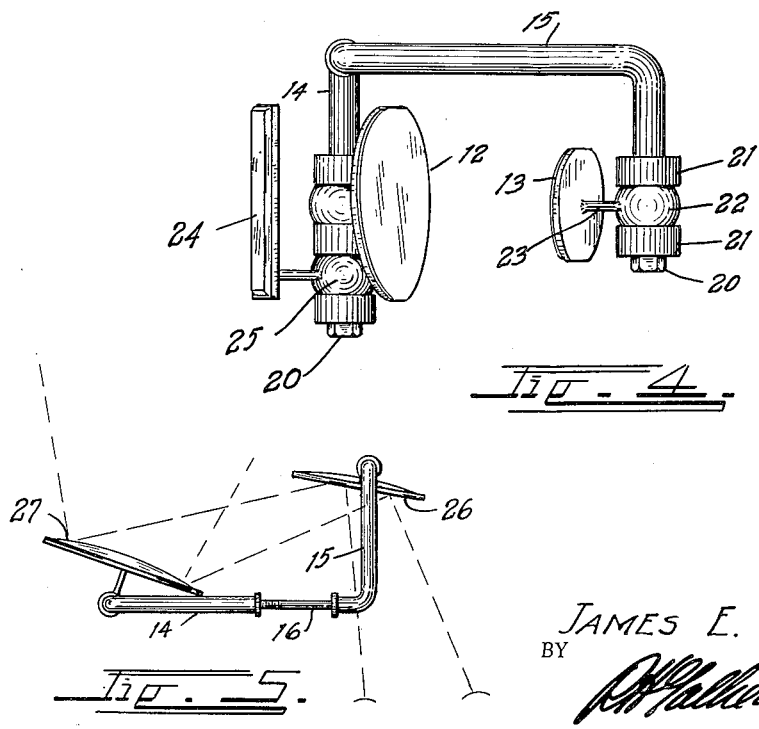
INVENTOR.
JAMES E. GRIFFITH.
BY
ATTORNEY.

Patented Oct. 4, 1938

2,132,026

UNITED STATES PATENT OFFICE 2,132,026

FORWARD VIEW MIRROR FOR AUTOMOBILES

James E. Griffith, Denver, Colo.

Application July 27, 1936, Serial No. 92,819

2 Claims. (Cl. 88—86)

It is often difficult for a motorist, when traveling in a line of congested traffic, to determine whether the road is sufficiently clear ahead to allow him to turn out of line to pass the car immediately ahead of him. The principal object of this invention is to provide an efficient periscopic device by means of which the driver can see around the car immediately in front to determine whether the road is clear ahead.

Other objects of the invention are to provide a device of this character, which will not obstruct the regular vision through the windshield of the automobile; which will not project beyond the running board at the side of the automobile; in which the various parts will be rigidly connected together on a common supporting member so that they will maintain their accurate spaced relation; and which can be easily and quickly applied to the usual automobile without interference with the operation of the doors thereof or the entrance or exit of the driver and passengers.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a perspective view illustrating the device as it would appear from the driver's position in an automobile.

Fig. 2 is a plan view thereof removed from the automobile.

Fig. 3 is an enlarged section taken on the line 3—3, Fig. 2.

Fig. 4 is an end view thereof looking on the line 4, Fig. 2.

Fig. 5 is a diagrammatic view illustrating an alternate form of the invention.

In the drawings a typical automobile is indicated by the numeral 10 and the left or driver's door thereof by the numeral 11.

The invention comprises an external mirror 12 and an internal mirror 13 positioned so that when the driver looks into the mirror 13, his line of vision will be reflected backwardly and outwardly into the mirror 12, thence forwardly alongside of the automobile and alongside of the line of travel. He can thus see all that would be visible to him should he have placed his head in the position of the mirror 12 and looked forwardly along the line of travel.

It is essential that the two mirrors be maintained accurately in position in order that the image will be accurately reflected from one mirror to the other and thence to the eyes of the operator when he is in the normal driving position. This is accomplished by mounting both mirrors upon the same supporting structure so that this structure will accurately hold the mirrors in their proper unitary relation.

The supporting structure comprises an outer bracket 14 and an inner bracket 15. The inner bracket might be termed double L-shaped, that is, it contains two right angle bends and the outer bracket is simply L-shaped. The inner bracket 15 is formed with a projecting threaded stud 16, which, when assembled, is threaded into an internal threaded socket in the extremity of the bracket 14.

In installing the device, a small hole is drilled through the upper bar of the door 11 to receive the threaded stud 16. The inner bracket is positioned by extending the stud through this hole, there being a flange 17 on the bracket to limit the amount of insertion. The outer bracket 14 is then threaded onto the stud and rotated until its flange, shown at 18, is clamped tightly against the outer face of the door. After these flanges have been clamped tightly into position, the bracket 14 may be locked on the stud 16 by means of a suitable set screw 19 so that the two mirrors 12 and 13 will be then supported by a complete unitary structure.

The bracket 14 has a relatively long outwardly extending arm which positions the mirror 12 outward from the car to a position above the outer edge of the car running board on that side. The inner bracket 15 has a relatively short horizontal arm which positions the inner mirror out of the way of both the windshield and the glass of the door 11. Both brackets have relatively short vertical outer extremities.

The mirror 13 has a width sufficient to allow both of the operator's eyes to view the image therein simultaneously. The mirror 12 is of slightly greater width and height since the field of vision gradually broadens as the distance from the eye increases.

It can be readily seen that by glancing upward to the left the driver can obtain a view of the road ahead along the entire line of travel thus obtaining a view that would normally be obstructed by the car or cars immediately ahead of him. This enables him to determine whether it is safe to turn from the line of traffic to pass the car ahead without placing his car in the path of oncoming traffic.

The mirrors may be attached to the brackets in any desired manner. It is preferred however to provide some means of adjustment in order that they may be placed to suit various individuals.

As illustrated the mirrors are mounted on simple and efficient ball and socket joints to provide the necessary adjustment. In applying the mirrors the downward depending extremities of both brackets are drilled and tapped to receive cap screws 20. The joints comprise two socket members 21, drilled for the passage of the cap screw 20 and having semi-spherical depressions for the reception of a ball 22. The ball 22 is formed with an enlarged bore for the passage of the screw 20 and to permit of adjustment. The mirror is mounted on the ball 22 by means of any suitable attachment arm 23.

It can be readily seen that the ball is free to turn through a limited vertical angle and through unlimited horizontal angles. This allows the mirrors to be raised and lowered or turned to the right or left as desired. It also provides for a twisting or rotative adjustment which is especially useful in aligning square or elongated mirrors. When the screw 20 is tightened the mirror is firmly locked in the preset position.

The inner mirror is so positioned that the normal closing of the door glass is not interfered with. The door 11 can also be freely opened and closed without disturbing the adjustment of the device.

If desired, the outer bracket 14 may be employed for simultaneously supporting a rear view mirror 24. The latter can also be supplied with an attachment ball 25 which can be clamped in place by simply adding additional socket washers 21. The same screw 20 then serves to clamp both mirrors in the desired adjusted position.

With the double mirror arrangement, the driver, without changing his position, can glance in the mirror 13 to determine what is ahead of him and in the mirror 24 to determine what is following. He can then determine his course with perfect safety.

In Fig. 5, a slightly different form of the invention is diagrammed. In this form, an inner concave mirror 26 is positioned at the inner extremity of the inner bracket 15 and an outer convex mirror 27 is positioned at the outer extremity of the outer bracket 14. The convex mirror 27 has a larger field of vision than a plane mirror and condenses this field into a small area. The concave mirror 26 acts to neutralize the reducing effect of the convex mirror and presents the image to the operator's eyes in its normal perspective. Such a form gives a wider range of vision to the operator with the same size or smaller mirrors.

It has also been found that when using the concave and convex mirrors a magnifying or telescopic effect can be obtained by the driver by simply drawing his head back to increase the distance between his eyes and the inner mirror 26. By decreasing this distance the images of the objects become smaller and the field of vision is broadened.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. The combination with an automobile having a door, of an inner mirror bracket; an inner mirror carried by said inner mirror bracket; an outer mirror bracket; an outer mirror carried by said outer mirror bracket at an angle to project an image of the roadway ahead of said automobile into said inner mirror, said inner and outer mirror brackets being positioned opposite each other on the inner and outer faces of said door; and a clamping stud connecting said brackets through said door, said stud being threaded into one of said brackets so that when the latter is threaded onto said stud both brackets will be brought into clamping relation against said door.

2. The combination with the door and windshield of an automobile of a first mirror positioned within said automobile adjacent said windshield; a second mirror positioned on the exterior of said automobile at an angle to reflect an image to said first mirror, thence to the eyes of the driver; the angular relation of said mirrors being such that the driver will obtain a straight-ahead vision from said second mirror from his normal driving position; an inner bracket extending first inwardly from the inner face of said door thence forwardly to a position adjacent said windshield, thence downwardly to said first mirror so as to position the latter to one side of said windshield; a second bracket extending first outwardly from the outer face of said door thence downwardly to said second mirror, said brackets being positioned opposite each other; and means extending through said door from one bracket to the other to draw said brackets toward each other so as to clamp said door therebetween.

JAMES E. GRIFFITH.